Feb. 18, 1964 F. R. DALLYE 3,121,770
PARALLEL BUNDLE CONDUCTOR SPACERS WITH VIBRATION DAMPENER
Filed Aug. 17, 1960 2 Sheets-Sheet 1
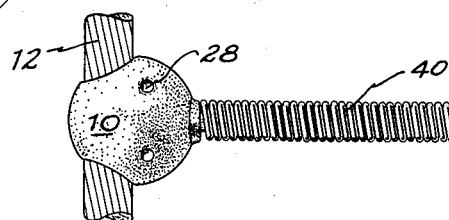
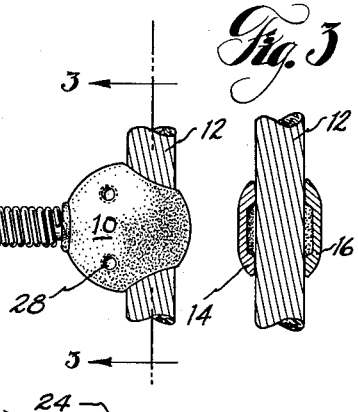
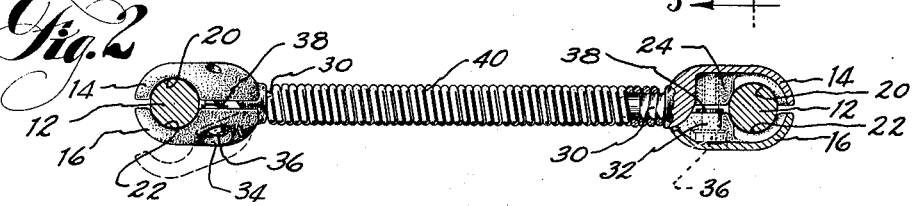
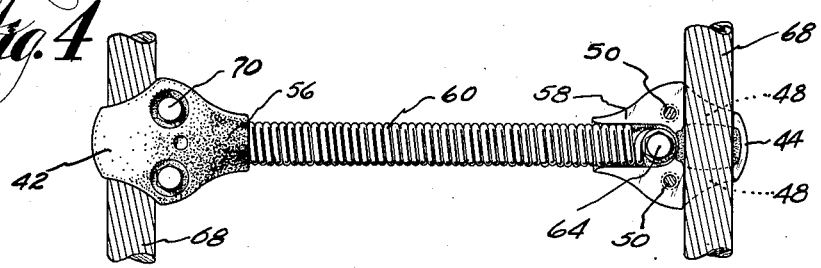
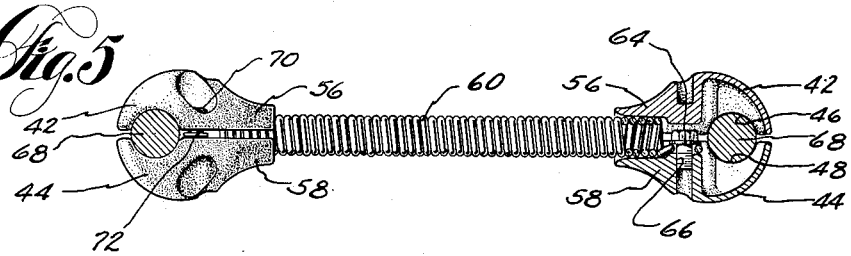
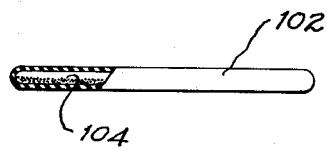
*INVENTOR.*
FREDERICK R. DALLYE
BY
*S. Ernest Low.*
ATTORNEY Feb. 18, 1964     F. R. DALLYE     3,121,770
PARALLEL BUNDLE CONDUCTOR SPACERS WITH VIBRATION DAMPENER
Filed Aug. 17, 1960     2 Sheets-Sheet 2

INVENTOR.
FREDERICK R. DALLYE
BY
*S. Ernest Low.*
ATTORNEY

United States Patent Office 3,121,770
Patented Feb. 18, 1964

3,121,770
PARALLEL BUNDLE CONDUCTOR SPACERS
WITH VIBRATION DAMPENER
Frederick R. Dallye, Pittsburgh, Pa., assignor to Aluminum Company of America, Pittsburgh, Pa., a corporation of Pennsylvania
Filed Aug. 17, 1960, Ser. No. 50,207
1 Claim. (Cl. 174—42)

This invention is addressed to spacer devices for association with multiple parallel conductors normally constituting a single phase of an electrical transmission or distribution system.

"Bundle conductors," as used herein, is a term applied to define suspended groups of parallel-spaced conductors, each group comprising one of the phases of a transmission circuit.

Bundle conductors are becoming increasingly popular in preference to installations employing only one conductor per phase, particularly in high voltage electrical energy transmission systems, with many favorable electrical advantages attributable thereto. Probably the most significant reasons for using bundle conductors are (1) reduction in corona loss using smaller diameter coductors, (2) lower line resistance, (3) lower surge impedance, (4) higher current capacity for equal conductor cross-sectional area, and (5) adaptation to the smaller diameter cables in bundles thereof of conventional existing accessories.

The advantages thus gained, however, are only possible of attainment when the substituted bundle conductor system provides for positive separation of the individual conductors, while permitting relative movement thereof resulting from wind-induced vibration and meteorological conditions, as well as from electro-dynamic forces developed between the conductors in a bundle thereof.

It is therefore an object of the present invention to provide a bundle conductor spacer device or mechanism of sufficient mechanical strength to insure and maintain a predetermined and desired spacing or separation between parallel runs of suspended conductors under imposed electrical and atmospheric loading of the conductors.

Another object of the invention is to provide a spacer mechanism, for use with bundle conductors, characterized by having sufficient flexibility to permit relative movement between the individual conductors in the bundle thereof.

A further object of the invention is to provide a spacer of sufficient rigidity to maintain a desired predetermined conductor spacing within a bundle thereof, while providing sufficient flexibility to relieve undue fatigue-producing stresses in the conductors adjacent their points of suspension as well as adjacent the points of attachment of the spacer on the conductors.

It is also an essential object to the success of spacer mechanisms falling within the scope of the invention that the integrated elements thereof, providing clamping attachment of the spacer on the individual conductors, insure and maintain intimate and firm electrical contact with the conductors and exert sufficient contant pressure therebetween to avoid development of varying electropotentials between the contacting surfaces of the spacers and conductors as a result of differential generated voltages within the conductors.

Manifestly other objects and advantages of the spacer mechanisms of the invention will be appreciated and understood from consideration of the following description and illustrations, in which:

FIG. 1 illustrates a top plan view of one embodiment of the spacer mechanism of the invention in its application to twin parallel conductors;

FIG. 2 illustrates a fragmentary transverse sectional view of the spacer mechanism of FIG. 1;

FIG. 3 illustrates a partial sectional view taken on the plane 3—3 of FIG. 1;

FIG. 4 illustrates a top plan view of a second embodiment of the spacer device of the invention with a right hand conductor-engaging element removed;

FIG. 5 illustrates a fragmentary transverse sectional view of the spacer device of FIG. 4;

FIG. 9 illustrates a partial sectional view of a vibration damping cartridge suitable for adaptation with spacer devices of the invention.

Figure 6:
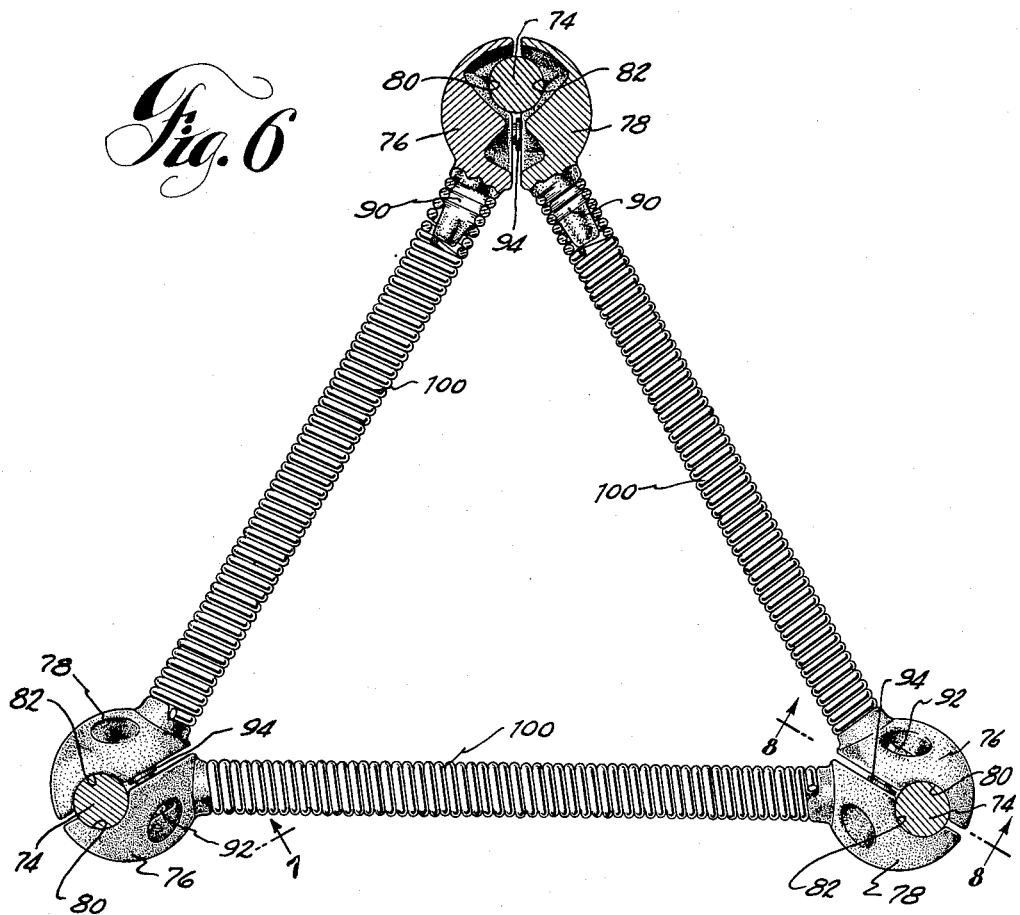
FIG. 6 illustrates a fragmentary transverse sectional view of a third embodiment of the invention in its application to three equispaced parallel conductors.

Basically the spacer devices or mechanisms of the present invention preferably incorporate separable pairs of conductor-clamping elements for clamping-engagement on the individual conductors in a bundle thereof in substantially a common transverse plane thereto. In addition, resilient close-coiled spring distance spacer elements are provided for connecting at least one member in each pair of conductor-clamping elements to a second conductor-clamping element in a pair of the same remote thereto on an adjacent conductor in a bundle of parallel suspended conductors to be accurately spaced and protected in an installation of the same.

The close-coiled spring distance spacer elements are unique in the spacer devices of the invention in that their inherent resiliency permits relative movement of the normally parallel suspended conductors, with which the spacer devices are employed, outwardly away from each other under wind-induced and electro-dynamic forces acting thereon, while the closed individual abutting coils of the spacer spring elements react to provide a rigid columnar support against inward collapse of the spacers under the aforesaid induced forces.

The coiled spring distance spacer elements also permit of torsional adjustment in their axial lengths, and development of intercoil friction between adjacent coils thereof serves to dampen wind-induced vibration of conductors with which the spacer mechanisms of the invention are employed.

In more specific terms, and referring first to the embodiment of the invention illustrated in FIGS. 1, 2 and 3, the spacer device is shown therein in its application to twin parallel conductors. The spacer device comprises a conductor clamp 10 for each of the conductors 12, the clamp in each instance being of generally flat, smooth oval shape in exterior configuration.

Each clamp 10 is composed of an upper element 14 and a lower cooperating or paired element 16 constituting a separable pair of elements for each clamping member 10. The clamp elements 14 and 16 are preferably fabricated from electrically conductive materials and are reduced in weight to a minimum, without sacrifice in strength, preferably as by casting or forging practices, with accompanying interior coring and metal-displacing techniques. To this end each of the elements 14 and 16 is of generally shell configuration and the oppositely disposed depending side walls of each shell 14 and 16 are provided with substantially semi-circular bearing grooves 20 and 22, respectively, for receiving and embracing therebetween the conductors 12 with which the spacer device is associated in use.

The side walls of the shell-shaped element 14 are thickened inwardly, inboard of the grooved portions 20 thereof, to provide bosses 24 in which are located threaded apertures 28 in axial depth direction thereof. The shell clamping member or element 14 is further thickened inwardly and centrally beyond the laterally spaced bosses 24 to provide a coarse threaded unitary, and preferably integral, spud extension 30 the axis of which preferably lies in a plane passing through the medial longitudinal axis of the conductor 12.

The mating clamping shell 16 of the paired elements 14 and 16, is also equipped with laterally spaced bosses 32 in substantial alignment below the bosses 24 of element 14. In this instance the bosses 32 are surface recessed or depressed at 34 to receive the heads of threaded bolts 36 extending upwardly through clearance apertures in registry with the threaded apertures in the overlying bosses 24.

A closed coil spring spacer element 40, preferably fabricated from high strength steel wire and selected in axial length in accordance with the desired distance between the twin conductors 12, is interiorly threadingly engaged at both of its ends on the extending spuds 30 of an adjacent pair of the clamping shell elements 14, the spuds being threaded to conform to the internal convolutions of the coiled spacer spring 40.

The above-described spacer mechanism of FIGS. 1, 2 and 3, with its coiled spring spacer member 40 supporting a threadedly engaged similar upper clamping element 14 at each of its ends, is disposed in spanning relationship in respect of the space between a pair of twin conductors 12 with the grooved wall portions 20 thereof in engagement with the upper exposed surface of each of the conductors 12. The lower clamping elements 16 are each brought into under clamping relationship with their grooved wall portions 22 in engagement with the under exposed surface of each of the conductors 12. Threaded bolt members 36, entered from the underside of the elements 16 and threaded into the apertures 28 in the upper clamping elements 14, are driven home to firmly clamp the twin conductors 12 and spacer mechanism in unitary assembly. As illustrated in dotted line construction in FIG. 2, the lower clamping shells 16 may be loosely preattached to their upper cooperating shells 14, the clearance bolt apertures in the lower elements 16 permitting separated angular displacement thereof (FIG. 2) for admission of the conductors 12.

It will be observed in regard to the spacer device of FIGS. 1, 2 and 3 that inward movement of the twin conductors 12 is resisted by columnar rigidity and strength of the close-coiled spring spacer element 40, while permitting resilient expansion or separation of the individual coils of the spring spacer element in response to and accommodation of relative movement of the twin conductors 12. Relative parallel xial movements of the conductors 12 is also accommodated by flexing of the spring spacer elements 40.

A natural or synthetic rubber, plastic or fiber washer 38 is recommended in tight fitting engagement on the threaded shank of each of the clamping bolts 36 following their insertion through the clearance apertures in the clamping elements 16. Uhe of the washers 38 avoids accidental displacement or loss of the bolts 36.

The embodiment of the spacer device of FIGS. 4 and 5 includes the basic features described in respect of the spacer of FIGS. 1, 2 and 3. It is to be observed, however, that upper and lower shell-shaped clamping elements 42 and 44 respectively, of substantially identical construction and capable of fabrication by casting or forging, preferably from electrically conductive materials, are provided in their laterally spaced walls with aligned grooved conductor-receiving bearing portions 46 and 48, respectively. Inboard of the grooved conductor-receiving bearing portions 46 and 48, the walls of the elements 42 and 44 are thickened inwardly to provide laterally spaced threaded apertures 50 in the lower clamping element 44 in axial registry with bolt or fastener clearance apertures in the upper clamping element 42. Each of the clamping shell-shaped elements 42 and 44 are also preferably configurated to incorporate inboard extending semi-circular hood extensions 56 and 58, respectively.

The distance spacer element 60 of the embodiment of the invention illustrated in FIGS. 4 and 5 is also selected in the form of a close-coiled steel spring with each of its terminal ends formed as an eye for receiving a restraining and attaching fastener, preferably a threaded bolt 64, in threaded engagement within a threaded aperture 66 located substantially centrally in each of the lower clamping shells 44. It will be observed in this connection that the semi-circular hood portions 56 and 58 extend inwardly along the axis of the coiled spring spacer element 60 approximately one diameter thereof affording a degree of clamping support upon the exterior convolutions of the spring spacer element.

The spacer mechanism of FIGS. 4 and 5 is preferably assembled with its lower shell elements 44 secured to opposite terminal ends of the coiled spring spacer element 60 by means of the aforementioned bolts 64. As thus assembled, the spacer device is placed with one each of the twin conductors 68 within the grooved wall portions 48 of the lower clamping shell elements 44 and the mating upper clamping shells 42 superimposed thereon and clampingly secured by means of suitable fasteners or bolts 70 extending through the aforesaid clearance apertures in the upper shells 42 into threaded engagement within the threaded apertures 50 in the lower shells 44. It will be manifest that the attachment of the spacer device of this embodiment of spacer mechanism could be reversed to place the lower clamping shells 44 in supporting engagement on the upper exposed surfaces of the twin conductors 68 and the mating clamping shells 42 assembled from the underside of the conductors. Regardless of the particular order of assembly and attachment selected, a natural or synthetic rubber, or other equivalent synthetic plastic or fiber washer 72, is recommended in tight fitting engagement on the threads of the clamping bolts 70 to avoid their accidental displacement and/or loss before they have been engaged within the threaded apertures 50.

The embodiment of the spacer of FIGS. 4 and 5 functions in the same manner as that of FIGS. 1, 2 and 3, the close-coiled spring 60 affording columnar rigidity and strength against inward interfering approach of the twin conductors 68, whereas relative movement of the conductors in an outward separating direction, or parallel to their axes, can take place within the resilient separation of the closed abutting coils of the spring spacer element 60.

Figure 7:
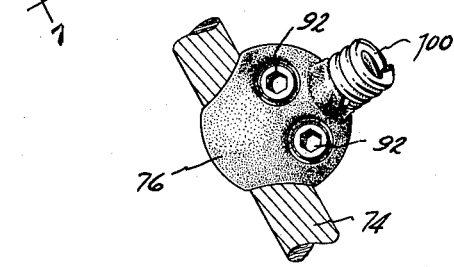
FIG. 7 illustrates a fragmentary exterior view taken in the direction of the arrows 7—7 in FIG. 6.
Figure 8:
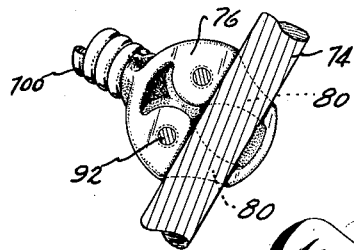
FIG. 8 illustrates a fragmentary view in the direction of the arrows 8—8 in FIG. 6.

The embodiment of the invention disclosed in FIGS. 6, 7 and 8 represents a modification of the spacer of FIGS. 1, 2 and 3 in its adaptation to a plurality, specifically three equilaterally spaced bundle conductors 74. Herein each conductor clamp comprises a mating pair of shell-like elements 76 and 78 provided with laterally spaced grooved bearings 80 and 82, respectively, for receiving and clamping on the conductors 74 therebetween.

The clamping elements 76 and 78 are in each instance, in this modification of the invention, provided with an integrally extending externally threaded spud 90, and close-coiled spacer springs 100, internally threadingly coupled to the spuds 90 in axially spaced pairs of the conductor-receiving and clamping shells 76 and 78, permit clamping assembly of adjacently mated so connected shells 76 and 78 on the conductors 74 in equilateral triangular pattern, as viewed in FIG. 6.

Fasteners or threaded bolts 92 extending through clearance apertures in the shell elements 76 into threaded engagement within aligned threaded apertures in the shell elements 78 serve to complete assembled attachment and installation of the spacer mechanism of FIGS. 6, 7 and 8, as best illustrated in FIG. 6. As in the previously described spacer devices, a natural or synthetic rubber, synthetic plastic or fiber washer 94, in tight fitting threaded engagement on the threaded shanks of the clamping bolts 92 will serve the useful purpose of retaining the clamping bolts in assembly within their clearance apertures in the clamping shell elements 76 against accidental loss on displacement.

Fabrication of the several forms of the conductor-clamping elements, described and illustrated hereinabove as essential elements of the spacer devices of the invention, is preferably accomplished by casting or forging the same. As earlier stated, the clamping elements are preferably of shell-like configuration, in the interest of weight reduction, coring practices in casting and metal displacing practices in forging the same insuring ready duplication of the clamping elements with desirable smoothly blended exposed surfaces in the interest of reducing and/or eliminating sharply defined corona discharge areas. It is also for this same reason that the heads of the clamping bolts, and nuts if associated therewith, are preferably disposed below the exposed surfaces of the clamping elements, within depressed areas, as defined by reference numeral 34 (FIG. 2) and pictorially illustrated in the remaining embodiments of the spacer devices of the invention. Sand blasting and selective grinding of the several clamping elements of the spacer devices of the invention have also resulted in attaining smoothly blended exposed surface-quality in the clamping elements.

Tests conducted on twin and equilaterally disposed conductors, employing the spacer devices of the invention, have been highly successful measured in terms of substantial reduction in corona discharge losses, dependable spacing of the individual conductors, and a range of flexibility in the spacer devices accommodating relative movement between the conductors well within atmospheric and electrically-induced loading thereof.

FIG. 9 illustrates a vibration damping cartridge in the form of a flexible bag or tube 102 of natural or synthetic fiber enclosing granular or comminuted flowable vibration damping media 104, such as sand, shot, or the like. The cartridge 102 is selected in cross-sectional diameter to fit within the interior diameter of the coiled springs 40, 60 and 100 of the spacer devices with the volume of the cartridge less than full, and preferably half full, of the flowable vibration damping media 104. Insertion of the cartridge 102 within the coiled spring struts 40, 60 or 100 will aid in the vibration damping characteristics of the spacer mechanisms of the invention.

Having fully described three selected embodiments of spacer mechanisms falling within the intended scope of the invention, and with the realization that the spacers may be extended to include their essential structural features in other forms of bundle conductor spacer devices, what is desired to be claimed is defined in the following claim.

I claim:

A bundle conductor spacer device for separating parallel suspended elongate conductors constituting one phase of an electrical transmission circuit, said device comprising separable conductor-engaging elements for clamping engagement in cooperating pairs thereof on each conductor in the bundle, the cooperating pairs of the conductor-engaging elements being configurated to provide shell-like smoothly blended curvilinear exposed surfaces substantially devoid of sharply defined corona discharge areas, a close-coiled spring spacer element having its adjacent spiral coils in abutting contact disposed between and unitarily attached at its opposite ends to at least one of the separable conductor-engaging elements in each cooperaing pair of the same, the longitudinal axis of the spring spacer element being in normal disposition to the axes of the parallel conductors in rigid columnar resisting approach and allowable resilient separation of the same, fastening means for drawing the conductor-engaging elements in each cooperating pair into conductor-receiving and conductor-clamping relationship on a conductor therebetween, said fastening means being confined within depressed areas below the exposed curvilinear surfaces of the cooperating pairs of conductor-engaging elements, and having a vibration damping means in the form of a flexible fiber cartridge containing less than its available interior volume of a flowable damping media supported within the confining interior of the close-coiled spring spacer element.

References Cited in the file of this patent

UNITED STATES PATENTS

| 686,605 | Grauel et al. | Nov. 12, 1901 |
| 784,654 | Biel | Mar. 14, 1905 |
| 1,997,627 | Casey | Apr. 16, 1935 |
| 2,469,167 | Little | May 3, 1949 |
| 2,927,147 | Flower | Mar. 1, 1960 |
| 2,974,184 | Mather | Mar. 7, 1961 |

FOREIGN PATENTS

| 279,251 | Great Britain | Oct. 27, 1927 |
| 724,729 | Great Britain | Feb. 23, 1955 |
| 808,109 | Great Britain | Jan. 28, 1959 |
| 827,743 | Great Britain | Feb. 10, 1960 |

OTHER REFERENCES

German Printed Application, 1,047,893, Dec. 31, 1958.
German Printed Application, 1,035,230, July 31, 1958.
Publication: Malmstrom, "Measure SC Forces on Spacers," Electrical World, vol. 146, No. 26, June 30, 1958, page 45.

UNITED STATES PATENT OFFICE
CERTIFICATE OF CORRECTION

Patent No. 3,121,770            February 18, 1964

Frederick R. Dallye

It is hereby certified that error appears in the above numbered patent requiring correction and that the said Letters Patent should read as corrected below.

Column 1, line 24, for "coductors" read -- conductors --; line 62, for "contant" read -- constant --; column 3, line 54, for "xial" read -- axial --; line 61, for "Uhe" read -- Use --; column 6, line 17, for "cooperaing" read -- cooperating --.

Signed and sealed 23rd day of June 1964.

(SEAL)
Attest:

ERNEST W. SWIDER
Attesting Officer

EDWARD J. BRENNER
Commissioner of Patents